United States Patent [19]

Shiraishi

[11] Patent Number: 5,287,092
[45] Date of Patent: Feb. 15, 1994

[54] PANEL DISPLAY APPARATUS TO SATISFACTORILY DISPLAY BOTH CHARACTERS AND NATURAL PICTURES

[75] Inventor: Tai Shiraishi, Nara, Japan

[73] Assignee: Sharp Kabushiki Kaisha, Osaka, Japan

[21] Appl. No.: 789,040

[22] Filed: Nov. 7, 1991

[30] Foreign Application Priority Data

Nov. 9, 1990 [JP] Japan ............................ 2-305009

[51] Int. Cl.⁵ .............................................. G09G 1/06
[52] U.S. Cl. ...................................... 345/137; 345/55; 345/84
[58] Field of Search ................ 340/723, 728, 784 J, 340/717, 716, 744, 747, 783, 766; 358/236, 241, 142, 146, 147; 375/103; 364/724.01

[56] References Cited

U.S. PATENT DOCUMENTS

| | | | |
|---|---|---|---|
| 4,833,625 | 5/1989 | Fisher et al. | 340/731 |
| 4,837,562 | 6/1989 | Nishiura et al. | 340/728 |
| 4,843,380 | 6/1989 | Oakley et al. | 340/728 |
| 4,855,728 | 8/1989 | Mano et al. | 340/717 |
| 4,894,540 | 1/1990 | Komatsu | 340/728 |
| 4,926,166 | 5/1990 | Fujisawa et al. | 340/717 |
| 4,958,361 | 9/1990 | Rosen et al. | 375/103 |
| 5,019,905 | 5/1991 | Pshtissky et al. | 358/142 |
| 5,097,257 | 3/1992 | Clough et al. | 340/728 |
| 5,107,255 | 4/1992 | Shiraishi | 340/731 |
| 5,109,451 | 4/1992 | Aono et al. | 382/56 |
| 5,140,315 | 8/1992 | Edelson et al. | 340/728 |

FOREIGN PATENT DOCUMENTS

| | | | |
|---|---|---|---|
| 58-59490 | 4/1983 | Japan | G09G 1/00 |
| 61-180293 | 8/1986 | Japan | G09G 3/36 |

OTHER PUBLICATIONS

Rosenfeld, *Digital Picture Processing*, 2nd Edition, vol. 1, Academic Press, Inc., 1982, pp. 10-18.

*Primary Examiner*—Jeffery Brier
*Assistant Examiner*—A. Au
*Attorney, Agent, or Firm*—Nixon & Vanderhye

[57] ABSTRACT

A panel display apparatus includes a V-RAM, a display controller, a low-pass filter and a panel display unit. Digital video signals read from the V-RAM by the display controller are input to the low-pass filter. Then, of the input digital video signals, high frequency components in spatial frequency characteristic thereof are removed, as required, by the low-pass filter under control of the display controller and the resulting digital video signals are fed to the panel display unit. Thus, satisfactory images are displayed on the panel display unit under the control of the display controller in accordance with the digital video signals from the low-pass filter whether the images are characters and graphics or natural pictures.

2 Claims, 6 Drawing Sheets

| WHEN EN="H" | | | | | |
|---|---|---|---|---|---|
| CK | ⎍⎍⎍⎍⎍ | | | | |
| VD(I) | VD(I) | VD(I+1) | VD(I+2) | VD(I+3) | |
| FF 31 OP (1) | VD(I-1) | VD(I) | VD(I+1) | VD(I+2) | |
| MPX 32 OP (2) | VD(I-1) | VD(I) | VD(I+1) | VD(I+2) | |
| ADDR 33 OP (3) | VD(I-1)+VD(I) | VD(I)+VD(I+1) | VD(I+1)+VD(I+2) | VD(I+2)+VD(I+3) | |
| FF 34 OP (4) | VD(I-2)+VD(I-1) | VD(I-1)+VD(I) | VD(I)+VD(I+1) | VD(I+1)+VD(I+2) | |
| MPX 35 OP (5) | VD(I-2)+VD(I-1) | VD(I-1)+VD(I) | VD(I)+VD(I+1) | VD(I+1)+VD(I+2) | |
| VO(I) | VD(I-2)+2VD(I-1)+VD(I) | VD(I-1)+2VD(I)+VD(I+1) | VD(I)+2VD(I+1)+VD(I+2) | VD(I+1)+2VD(I+2)+VD(I+3) | |

PANEL DISPLAY APPARATUS TO SATISFACTORILY DISPLAY BOTH CHARACTERS AND NATURAL PICTURES

BACKGROUND OF THE INVENTION

1. Field of the Invention

The present invention relates to improvement in a panel display apparatus.

2. Description of the Prior Art

Figure 5:
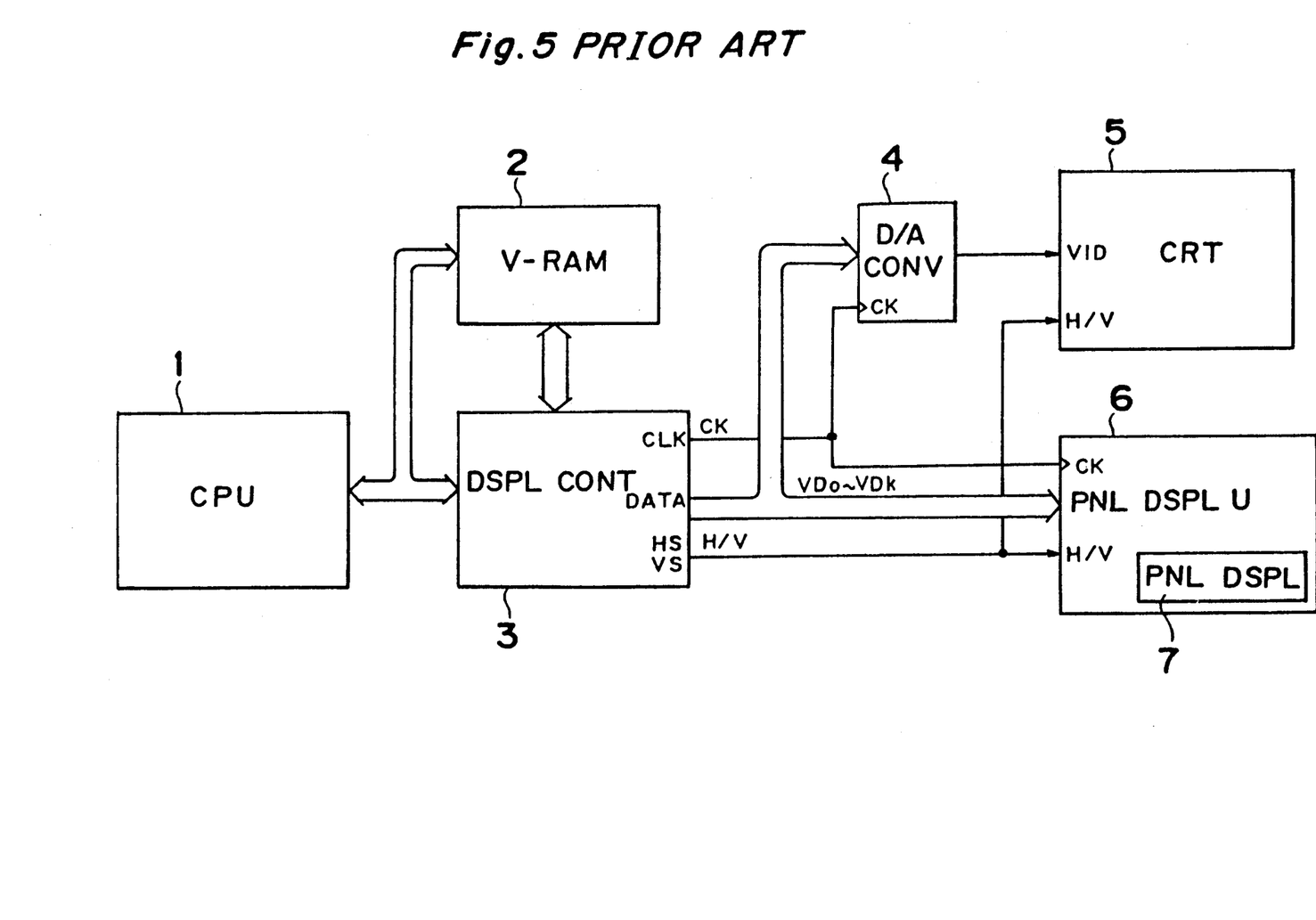
FIG. 5 is a block diagram showing a conventional panel display apparatus.

FIG. 5 shows a conventional panel display apparatus such as a liquid crystal display. The panel display apparatus of FIG. 5 designed to display images on both a CRT (Cathode-Ray Tube) 5 and a panel display 7, comprises a CPU (Central Processing Unit) 1, a V-RAM (Video Random Access Memory) 2, a display controller 3, and the like. A video signal read from the V-RAM 2 is outputted by the display controller 3 in accordance with instructions of the CPU 1 as a few bit digital video signals $VD_o$-$VD_k$. The digital video signals $VD_o$-$VD_k$ are converted into an analog video signal by a D/A (Digital-to-Analog) converter 4 and fed into the CRT 5. Then the CRT 5 produces an image in accordance with both the resulting analog video signal and horizontal/vertical synchronizing signals H/V that are fed by the display controller 3.

The digital video signals $VD_o$-$VD_k$ outputted by the display controller 3 are also fed into a panel display unit 6. Then the panel display unit 6 produces an image in accordance with both the digital video signals $VD_o$-$VD_k$ and the aforementioned horizontal/vertical synchronizing signals H/V. Thus, using the same digital video signals $VD_o$-$VD_k$, both the CRT 5 and the panel display 7 simultaneously reproduce the same image.

However, the conventional panel display apparatus as described above has the following problems.

Figure 6:
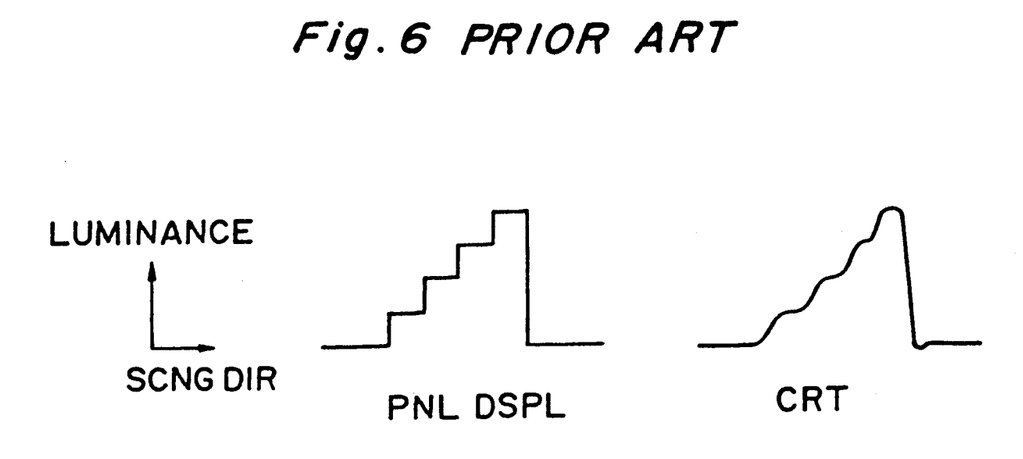
FIG. 6 is a view for explaining the luminance variation in both a CRT and a panel display of the panel display apparatus in FIG. 5.

Because the pixels in the panel display 7 are thoroughly independent of each other, an image reproduced on the panel display 7 can be represented as an aggregate of images in the units of pixels obtained from the sampling data which result from sampling the digital video signals $VD_o$-$VD_k$ for each pixel. In contrast to this, in the case of an image reproduced on the CRT 5, although it is subject to sampling by a shadow mask, a video signal cannot be represented as thoroughly discrete images because of the high frequency characteristic of the CRT's electrical circuit typified by flyback transformers, the incapability of stopping down the spot diameter of scanning beam to a proper one, and other reasons. In other words, in representing an image the luminance of which is relative to the distance in a scanning direction, the luminance variation of an image reproduced on the panel display 7 results in stepped waveform, while that of an image reproduced on the CRT 5 results in rounded waveform without corners as shown in FIG. 6.

Therefore, it can be said that the luminance variation of an image reproduced on the CRT 5 can be expressed by a continuous function in which high frequency components are cut off in the spatial frequency characteristic of digital video signals toward the scanning direction.

Because of such difference in the spatial frequency characteristic of the input digital video signals $VD_o$-$VD_k$, in displaying characters and graphics, the panel display 7 can present satisfactory images with sharply outlined characters and graphics, while the CRT 5 displays images with somewhat blurred outlines. Further, in displaying characters and lines, the panel display 7, having independent pixels, can present sharply outlined characters and lines, while the CRT 5, poor in high frequency characteristic, results in images blurred in outline.

Meanwhile, natural pictures such as people and landscapes involve less edges in their luminance variation waveform and have more portions where the luminance at their outlines gradually varies. For this reason, in displaying natural pictures, the CRT 5, which has images blurred in outlines as described above, can offer satisfactory images, while the panel display 7, which involves stepped waveform of luminance variation, results in coarse display with the luminance variation emphasized in outlines.

In consequence, the panel display 7 is successful in character and graphic images but inferior to the CRT 5 in images of natural pictures.

SUMMARY OF THE INVENTION

The object of the present invention is therefore to provide a panel display apparatus which can present satisfactory images, whether the images are characters and graphics or natural pictures.

In order to achieve the aforementioned object, there is provided a panel display apparatus in which an image is displayed on panel display means under control of display control means in accordance with digital video signals read from digital video signal storage means by the display control means, comprising:

filter means for receiving the digital video signals read from the digital video signal storage means by the display control means, and, under the control of the display control means, rejecting high frequency components in spatial frequency characteristic of the received digital video signals, as required, to feed the resulting digital video signals to the panel display means.

A digital video signal read from the digital video signal storage means by the display control means is input to the filter means. Then, of the input digital video signals, high frequency components in spatial frequency characteristic thereof is rejected, as required, by the filter means under the control of the display control means and the resulting digital video signals are fed to the panel display means. Thus, an image is displayed on the panel display means under the control of the panel display control means in accordance with the digital video signal from the filter means.

Accordingly, for images having more portions where the luminance rather gradually varies in outlines, such as natural pictures, there can be presented on the panel display satisfactory images having more natural luminance variation in outlines by rejecting high frequency components in the spatial frequency characteristic of the digital video signal by the control of the display control means. On the other hand, for images having sharp outlines, such as characters and graphics, there can be presented on the above panel display satisfactory images having sharp luminance variation in outlines by arranging not to reject high frequency components of the digital video signal by the control of the display control means.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Described below is an embodiment which employs, as its panel display unit, an active matrix thin-film transistor liquid crystal display panel (hereinafter, referred to as an active matrix TFT-LCD panel) that allows multi-grade display.

Figure 1:
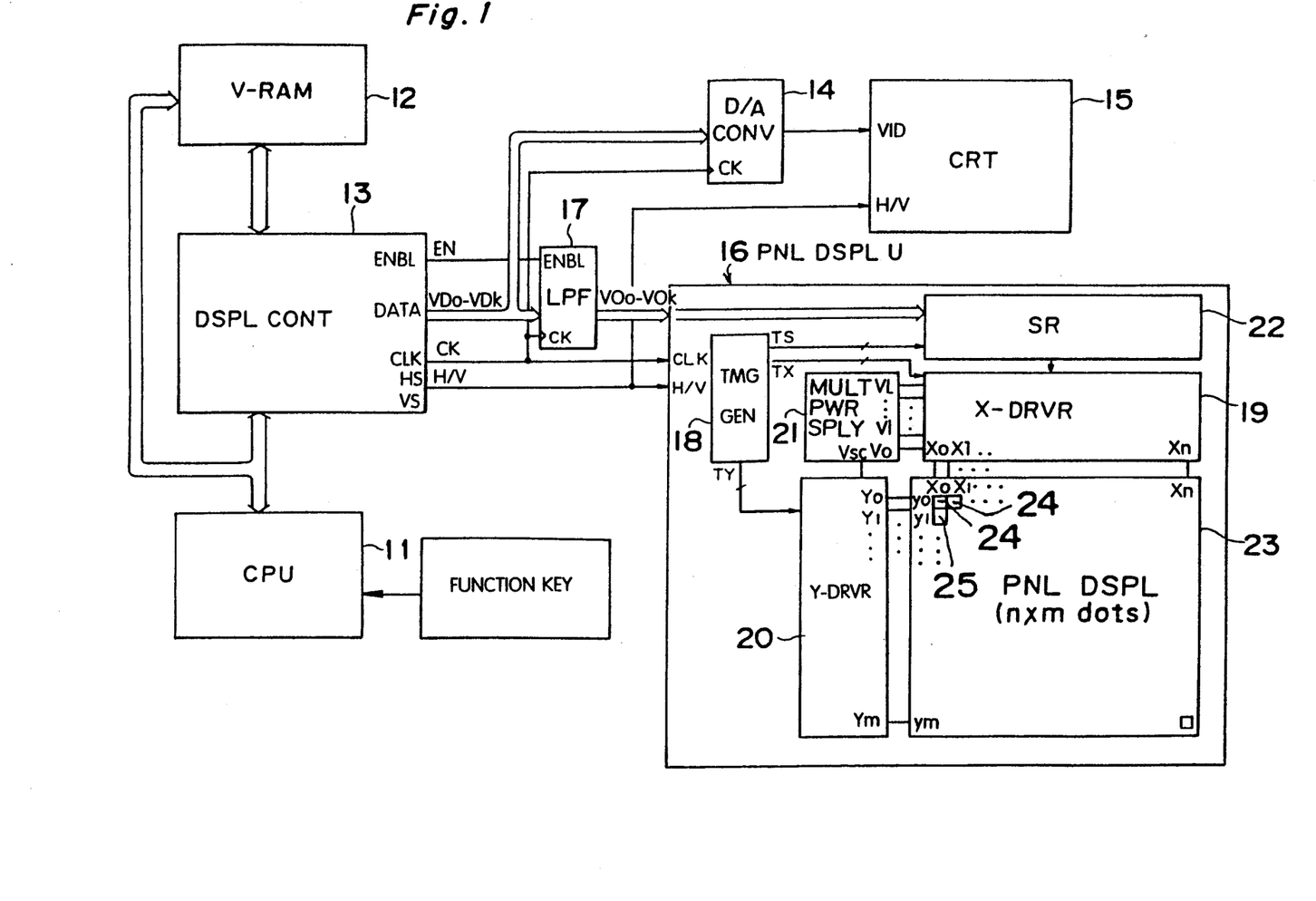
FIG. 1 is a block diagram showing an embodiment of a panel display apparatus in accordance with the present invention.

FIG. 1 is a block diagram showing an example of a panel display apparatus for use of the active matrix TFT-LCD panel, the apparatus being adapted to present an image also on a CRT as well as on the TFT-LCD panel. The panel display apparatus is mainly constituted of a CPU 11, a V-RAM 12, a display controller 13, a D/A converter 14, a CRT 15, a panel display unit 16, and a low-pass filter (hereinafter, abbreviated as LPF) 17.

In accordance with an instruction of the CPU 11, a digital video signal read from the V-RAM 12 which is a video signal storage means is outputted by the display controller 13 as a few bit digital video signals $VD_o$-$VD_k$. The display controller 13 is an example of a display control means. The digital video signals $VD_o$-$VD_k$ are then fed into both the D/A converter 14 and the LPF 17. The LPF 17 is an example of a filter means. The digital video signals $VD_o$-$VD_k$ fed into the D/A converter 14 are thereby converted into an analog video signal, which is in turn applied to the CRT 15. Then the CRT 15 produces an image in accordance with both the input analog video signal and horizontal/vertical synchronizing signals H/V outputted from the display controller 13.

On the other hand, the digital video signals $VD_o$-$VD_k$ fed into the LPF 17 have high frequency components in the spatial frequency characteristic removed when the level of an enable signal EN from the display controller 13 is "H", and outputted as digital video signals $VO_o$-$VO_k$. Meanwhile, when the level of the enable signal EN is "L," the input video signals $VD_o$-$VD_k$ are outputted as digital video signals $VO_o$-$VO_k$ as they are without the high frequency components in the spatial frequency characteristic being removed.

Thus, the LPF 17 is activated by the enable signal EN of "H" level outputted from the display controller 13. One method is below described to generate the enable signal EN. In this method, control data includes an identification code and is appended to the digital video signals. The identification code indicates if the digital video signals are character data or natural picture data. It is discriminated with reference to the identification code based on a user program whether the digital video signals are the character data or the natural picture data. If it is judged that the digital video signals are the character data in the above discrimination, the LPF 17 is disabled and the digital video signals are directly fed to the panel display unit 16 as is. On the other hand, if the digital video signals are the natural picture data, the LPF 17 is enabled to function and the video digital signals are processed by the LPF 17 and inputted to the panel display unit 16.

Another method for generating the enable signal EN is provided. In this method, one of the function keys in an input device of a personal computer is assigned to a selection key to determine whether or not the LPF 17 is interposed between the display controller 13 and the panel display unit 16. This method allows modification of the image in the panel display unit 16 on the basis of visual judgment concerning the image.

The panel display unit 16, serving as panel display means, comprises a timing generator 18, an X-driver 19, a Y-driver 20, a multiple power supply 21, a shift register 22, and a panel display 23. The panel display unit 16 receives the digital video signals $VO_o$-$VO_k$ from the LPF 17 and the horizontal/vertical synchronizing signals H/V and clock signals CK from the display controller 13. Then, according to the horizontal/vertical synchronizing signals H/V and clock signals CK, the timing generator 18 generates a timing signal TX for driving the X-driver 19, a timing signal TY for driving the Y-driver 20, and a timing signal TS for driving the shift register 22. Further, according to the clock signals CK and the digital video signals $VO_o$-$VO_k$, the multiple power supply 21 generates voltage levels $V_o$ through $V_L$, each corresponding to each gradation of shades on the panel display 23, and a voltage $V_{sc}$ which is fed to a scanning line. The shift register 22 transfers, out of the data having been stored therein, image data corresponding to one scanning line on the panel display 23 which is composed of the digital video signals $VO_o$-$VO_k$ from the LPF 17, to the X-driver 19 for every horizontal/vertical synchronizing signal H/V. At the same time, the shift register 22 resets its counter (not shown), and then receives and stores digital video signals $VO_o$-$VO_k$ for the leftmost to rightmost pixels on one complete scanning line, in succession according to the clock signals CK.

The above-mentioned panel display unit 16 produces an image in the following way. Upon receiving a vertical synchronizing signal V, the panel display unit 16 resets each counter (not shown) of the X-driver 19, the Y-driver 20, and the shift register 22. Then, first the shift register 22 is driven by a timing signal TS from the timing generator 18, reserving the one-line image data corresponding to the scanning line $y_o$ located at the top of the panel display 23. Then, upon receiving a horizontal synchronizing signal H, image data corresponding to one scanning line $y_o$ on the panel display 23 having been stored in the shift register 22 is transferred to the X-driver 19. At the same time, the Y-driver 20 is driven by the timing signal TY from the timing generator 18 to activate the scanning line $y_o$ at the panel display 23, taking in the charge voltage $V_{sc}$ charged to the multiple power supply 21. The output terminal $Y_o$ of the Y-driver 20 is then activated, applying the voltage $V_{sc}$ to the scanning line $y_o$ on the panel display 23.

Next, the X-driver 19 is driven by the timing signal TX from the timing generator 18. Then, according to the image data corresponding to the loaded one scanning line $y_o$, the X-driver 19 selects, depending on gradation, voltage levels each corresponding to each of data lines $x_o$-$x_n$ in the panel display 23 out of the charge voltages $V_o$ to $V_L$ charged to the multiple power supply 21 to transfer the resulting voltages from its output terminals $X_o$-$X_n$ to the data lines $x_o$-$x_n$ on the panel display 23.

The pixel electrode (not shown) of each pixel 24, 24, ... in the scanning line $y_o$ on the panel display 23 selected in the way as above is kept charged with a voltage corresponding to the gradation based on corresponding digital video signals $VO_o$-$VO_k$ until the succeeding horizontal synchronizing signal H comes in. As a result, pixels 24, 24, ... on the scanning line $y_o$ are put into display. In the meantime, the shift register 22 takes in the image data corresponding to the following scanning line $y_1$ in succession starting with the digital video signals $VO_o$-$VO_k$ corresponding to the leftmost pixel on the line $y_1$.

Next, when a succeeding horizontal synchronizing signal H is input, the one-line image data stored in the shift register 22 corresponding to the scanning line $y_1$ is transferred to the X-driver 19. At the same time, the counter in the Y-driver 20 counts up to activate the output terminal $Y_1$, applying the voltage $V_{sc}$ to the scanning line $y_1$ on the panel display 23. Then, according to the one-line image data corresponding to the loaded scanning line $y_1$, the X-driver 19 selects, depending on gradation, voltage levels corresponding to each of data lines $x_o$-$x_n$, which are supplied to the data lines $x_o$-$x_n$ on the panel display 23. The electrode of each pixel 25, ... in the scanning line $y_1$ selected in the way mentioned above is kept charged with a voltages corresponding to the gradation of shades based on the corresponding digital video signals $VO_o$-$VO_k$ until the next horizontal synchronizing signal comes in. As a result, pixels 25, ... on the scanning line $y_1$ are put into display.

In the same manner as above, the succeeding one-line image data for the next scanning line is taken in the shift register 22, and the succeeding line is selected by the Y-driver 20 according to the input of a horizontal synchronizing signal H, to which line corresponding voltages $V_{sc}$ are applied. Besides, voltages selected depending on gradation according to the one-line image data corresponding to the succeeding scanning line loaded by the X-driver 19 are supplied to the data lines $x_o$-$x_n$. This operation is repeated until the succeeding vertical synchronizing signal V is input, thus allowing an image to be produced on the panel display 23.

The panel display apparatus in FIG. 1 as described above is for use with a monochrome panel display. In the case of a panel display apparatus for use with a color panel display, it is possible for the apparatus to produce color images on the panel display in the same procedure as in the above-mentioned monochrome panel display, by providing an apparatus with three sets of D/A converters 14 and LPFs 17, each for red, green, and blue, and by using a color panel display unit as the panel display unit.

Figure 2:
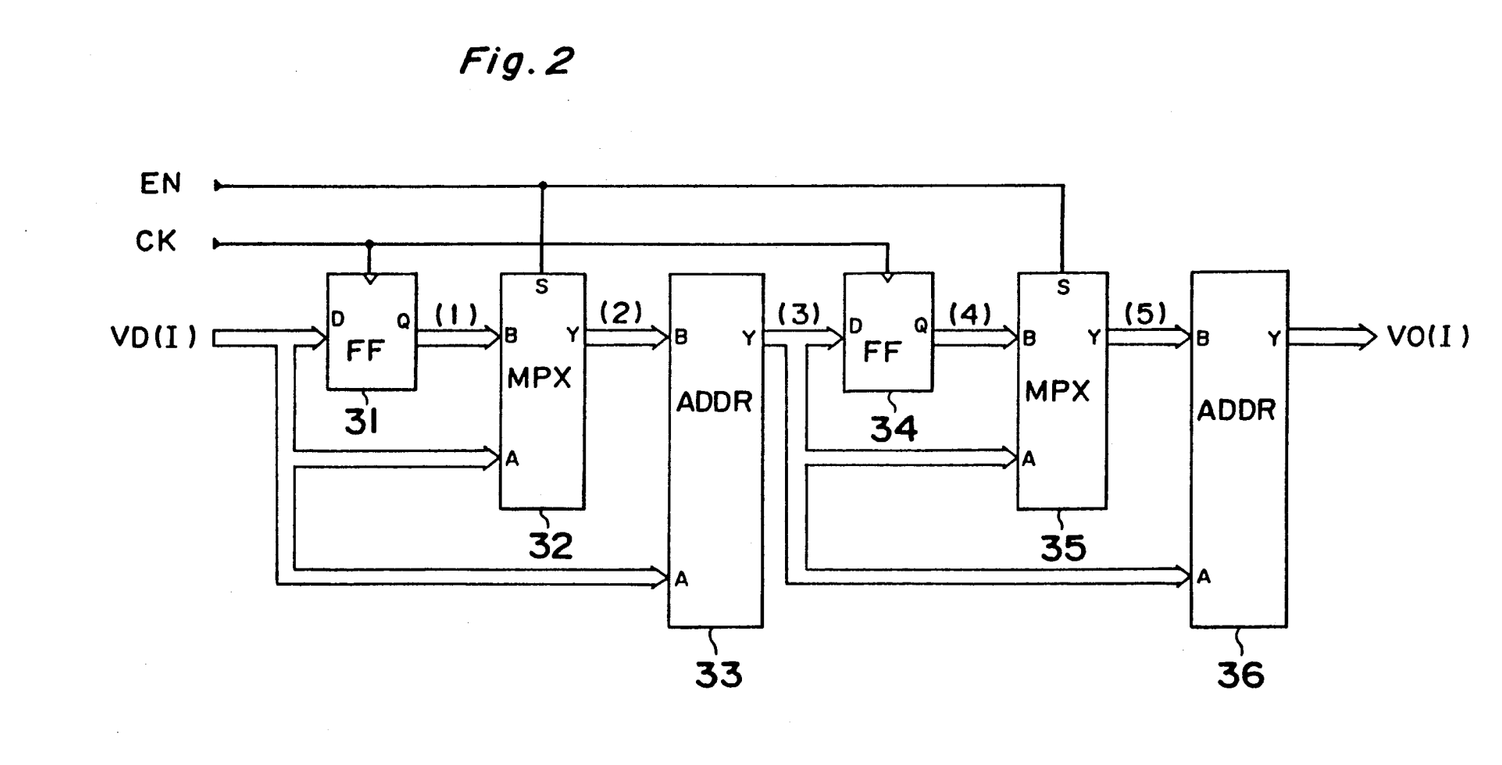
FIG. 2 is a block diagram showing an example of a low-pass filter shown in FIG. 1.

For the LPF 17, a variety of circuits can be provided, a typical example of which is a smoothing circuit as shown in FIG. 2. This LPF (smoothing circuit) 17 is composed of two flip-flops 31, 34, two multiplexers 32, 35, and two adders 33, 36. The flip-flops 31, 34 output the stored data at the output terminals Q on the leading edge of the clock signal CK. The multiplexers 32, 35 output data entered to the input terminals B to the output terminals Y when the input signals to the terminals S are at "H" level, while they output data entered to the input terminals A to the output terminals Y when the input signals to the terminals S are at "L" level. The adders 33, 36 then add the two pieces of data entered to their input terminals A and B to yield output to the output terminals Y.

Figure 3:
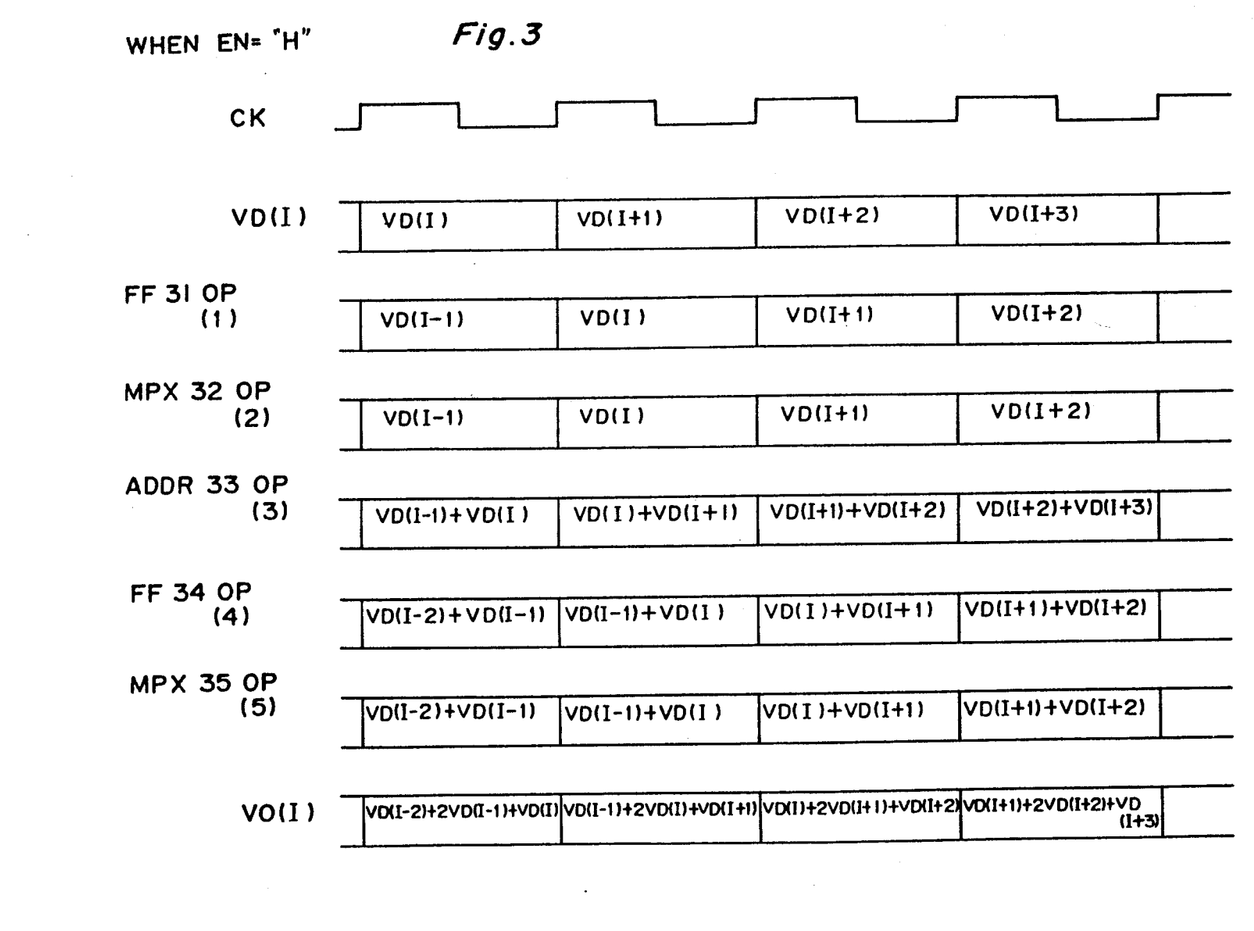
FIGS. 3 and 4 are diagrams showing an output at each part of the low-pass filter of FIG. 2.
Figure 4:
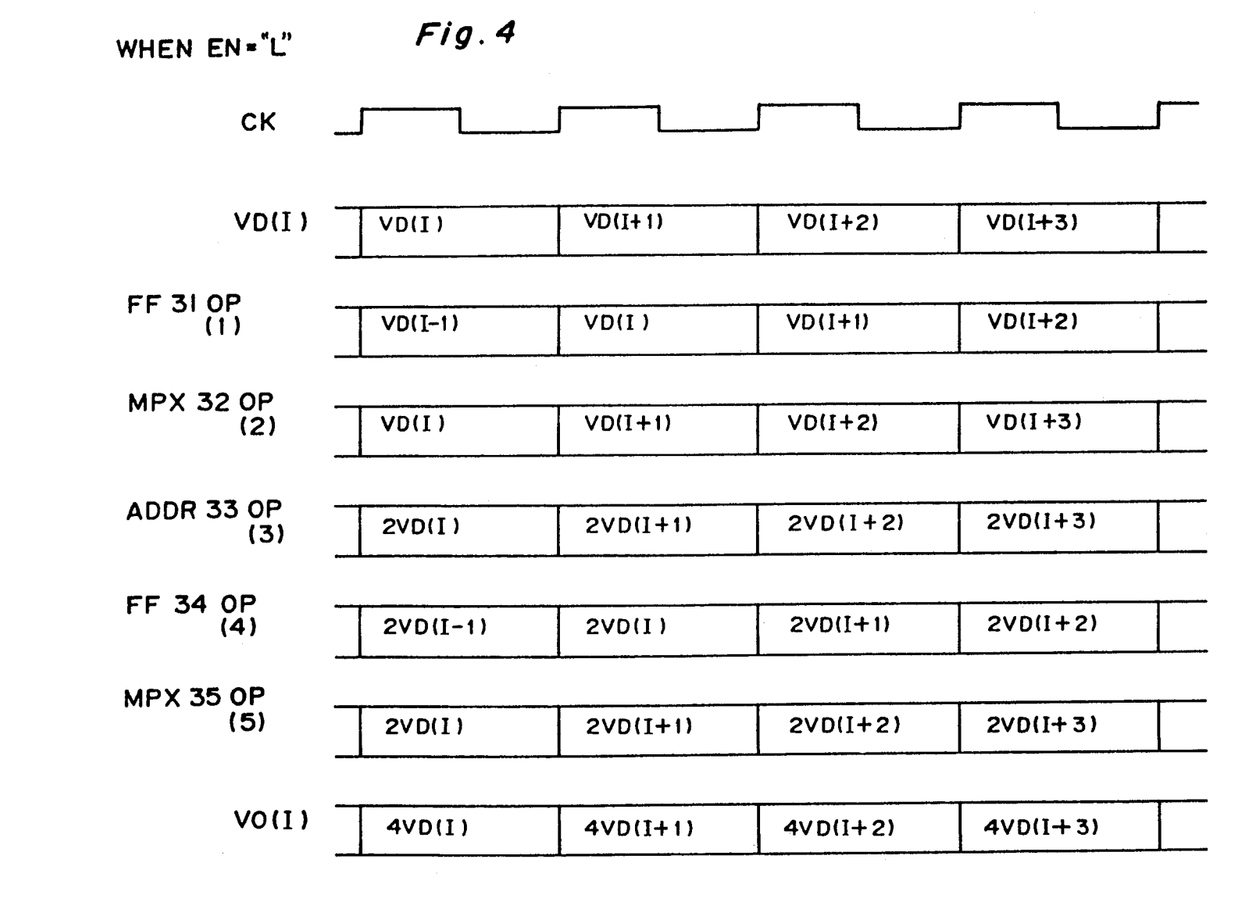

The operation of the LPF 17 is below described. FIGS. 3 and 4 respectively represent time charts of outputs at each part of the LPF 17 when the enable signal EN are levels of "H" and "L". In FIGS. 2, 3 and 4, VD(I) is vector representation of digital video signal $VD_o$-$VD_k$ at time I, which is outputted from the display controller 13. In other words, suffixes $o$-$k$ in the representation of the digital video signals $VD_o$-$VD_k$ respectively indicate each bit thereof, and VD(I) designates all of digital video signals $VD_o$-$VD_k$ at time I. These signals VD(I) are inputted from the display controller 13 to the LPF 17, synchronizing with the leading edge of the clock CK.

(A) When the enable signal EN outputted from the display controller 13 is at "H" level:

It is now assumed that the flip-flop 31 latches a digital video signal VD(I−1) which is one clock period preceding. The moment the clock signal CK turns to "H", the flip-flop 31 outputs the digital video signal (1): VD(I−1) which is one clock period preceding, feeding it to the input terminal B of the multiplexer 32. Since the enable signal EN is "H" at that time, the input signal to the terminal S of the multiplexer 32 is also "H". The multiplexer 32 outputs the digital video signal (2): VD(I−1) entered to the input terminal B to the output terminal Y. The adder 33 adds the digital video signal (2): VD(I−1) entered to its input terminal B and a digital video signal VD(I) entered to its input terminal A, outputting a digital video signal $$VD(I-1)+VD(I).$$

The flip-flop 34 then keeps latching the one-clock period preceding output data (3): VD(I−2)+VD(I−1) provided by the adder 33. Since the clock signal is "H" at that time, the flip-flop 34 also outputs this data (4). The multiplexer 35, in which the input signal to its terminal S is at "H," sends the same data (5) to the input terminal B of the adder 36. The adder 36 then adds the digital video signal $$VD(I-2)+VD(I-1)$$

entered to its terminal B and the digital video signal $$VD(I-1)+VD(I)$$

entered to its terminal A, yielding output of a digital video signal $$VD(I-2)+2VD(I-1)+VD(I).$$

In this case, shifting the resulting digital video signal by two bits toward the least significant bit gives a quotient that results from dividing the signal data by 4. Thus if this value is output as a digital video signal VO(I), $$VO(I)=\{VD(I-2)+2VD(I-1)+VD(I)\}/4.$$

This equation represents a weighted addition mean of the digital video signals with respect to three adjoining pixels. Consequently the LPF 17 given by a smoothing circuit serves to remove high frequency components in the spatial frequency characteristic of a digital video signal by smoothing the digital video signal.

(B) When the enable signal EN is at "L" level:

The moment the clock signal CK turns to "H," the flip-flop 31 outputs the digital video signal (1): VD(I−1) which is one clock period preceding, feeding it to the input terminal B of the multiplexer 32. Since the enable signal EN is then at "L" level, the input signal to the terminal S of the multiplexer 32 is also at "L" level. The multiplexer 32 outputs the digital video signal (2): VD(I) entered to its input terminal A to the output terminal Y. The adder 33 adds the digital video signal VD(I) entered to its input terminal B and the digital video signal VD(I) entered to its input terminal A, yielding output of a digital video signal $$2VD(I).$$

Since the input signal to the terminal S of the multiplexer 35 is also at "L" level, the multiplexer 35 sends the output data (3) from the adder 33 entered to the input terminal A to the adder 36. The adder 36 then adds the digital video signal (5):

$$2VD(I)$$

entered to the input terminal B thereof and the digital video signal (3):

$$2VD(I)$$

entered from the adder 33 to the terminal A of the adder 36, yielding output of a digital video signal $$4VD(I).$$

In this case, shifting the resulting digital video signal by two bits toward the least significant bit gives a quotient that results from dividing the signal data by 4. Thus if this value is output as a digital video signal VO(I), $$VO(I) = VD(I).$$

This equation means that an input digital video signal is outputted as it is, without high frequency components in the spatial frequency characteristic of the digital video signal being removed.

The LPF 17, as described above, yields output of digital video signals $VO_o$ to $VO_k$ with their high frequency components in the spatial frequency characteristic removed when the enable signal EN from the display controller 13 is at "H" level, while it yields output of digital video signals $VO_o$ to $VO_k$ without the high frequency components being removed when the enable signal EN is at "L" level.

As shown above, in this embodiment, digital video signals $VD_o$-$VD_k$ outputted from the display controller 13 are fed to the panel display unit 16 via the LPF 17. At that time, when the enable signal EN from the display controller 13 is at "H" level, the digital video signals $VO_o$-$VO_k$ are fed to the panel display unit 16 with their high frequency components in the spatial frequency characteristic rejected by the LPF 17. On the other hand, when the enable signal EN is at "L" level, the digital video signal $VO_o$-$VO_k$ are fed to the panel display unit 16 without the high frequency components being rejected by the LPF 17.

Accordingly, to display on the panel display 23 images, such as characters and graphics, in which sharp outlines are required, the enable signal EN entered from the display controller 13 to the LPF 17 is made at "L" level thereby to feed the digital video signals $VO_o$-$VO_k$ to the panel display unit 16 without the high frequency components in the spatial frequency characteristic being rejected. To display on the panel display 23 images, such as natural pictures, in which gradual luminance variation is required in outlines, the enable signal EN entered from the display controller 13 to the LPF 17 is made at "H" level thereby to feed the digital video signals $VO_o$-$VO_k$ to the panel display unit 16 with the high frequency components in the spatial frequency characteristic rejected. As a result, satisfactory images can be obtained only by switching over the level of the enable signal EN, whether they are characters and graphics or natural pictures.

Although a smoothing circuit is employed as the LPF 17 in the above embodiment, the LPF 17 may be any other proper circuit without being limited thereto.

Also, although an active matrix TFT-LCD panel is employed as the panel display unit 16 in the above embodiment, the present invention is not necessarily limited thereto.

Furthermore, although the panel display apparatus in the above embodiment is arranged to display the same image on both the CRT 15 and the panel display 23 based on the same digital video signals $VD_o$-$VD_k$, it may also be arranged to display an image only on the panel display 23.

As apparent from the above description, the panel display apparatus according to the present invention is adapted to reject by the filter means high frequency components in the spatial frequency characteristic of a digital video signal read from the digital video signal storage means by the display control means, as required, and display an image on the panel display means according to the digital video signal from the filter means. As a result, the panel display apparatus can display images on the panel display means according to either a digital video signal with its high frequency components in the spatial frequency characteristic rejected or a digital video signal without the high frequency components being rejected, as required, under the control of the display control means.

In consequence, according to the present invention, for characters and graphics, it is possible to display sharply outlined images on the panel display means according to digital video signals without their high frequency components in the spatial frequency characteristic being rejected. On the other hand, for natural pictures, it is possible to display images having gradual luminance variation in outlines on the panel display means according to digital video signals with their high frequency components in the spatial frequency characteristic being rejected. The present invention therefore allows excellent images to be obtained, whether the images are characters and graphics or natural pictures.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A panel display apparatus in which an image is displayed on panel display means under control of display control means in accordance with digital video signals read from digital video signal storage means by the display control means, comprising:

filter means for receiving the digital video signals read from the digital video signal storage means by the display control means, and, under the control of the display control means, eliminating high frequency components in spatial frequency characteristic of the received digital video signals to feed the resulting digital video signals to the panel display means, wherein the filter means is a smoothing circuit comprising:

a first flip-flop which receives the digital video signals read from the digital video signal storage means and is controlled by a clock signal outputted from the display control means;

a first multiplexer which receives both an output of the first flip-flop and the digital video signals read from the digital video signal storage means as input data signals, and is controlled by the filter enablement signal outputted from the display control means to determine which input data signal is selected;

a first adder which adds an output signal of the first multiplexer and the digital video signals read from the digital video signal storage means;

a second flip-flop which receives an output signal of the first adder and is controlled by the clock signal outputted from the display control means;

a second multiplexer which receives both an output signal of the second flip-flop and the output signal of the first adder as input data signals, and is controlled by the filter enablement signal outputted from the display control means to determine which input data signal is selected; and a second adder which obtains and outputs an addition mean of an output signal of the second multiplexer and the output signal of the first adder to the panel display means.

2. An image display system comprising:

video signal storage means for storing digital video signals representative of video images;

digital-to-analog converter means for converting the digital video signals stored in the video signal storage means to analog video signals;

analog video display means connected to the digital-to-analog converter for using the analog video signals to display the video images;

a panel display for using the digital video signals applied thereto to display the video images;

filter means for eliminating, in response to a filter enablement signal, high frequency components in the spatial frequency of the digital video signals stored in the video signal storage means prior to application of the digital video signals to the panel display;

display control means for applying the same digital video signals stored in the video signal storage means to the filter means and to the digital-to-analog converter means, and for selectively generating the filter enablement signal;

wherein the filter means comprises:

a first flip-flop which receives the digital video signals read from the digital video signal storage means and is controlled by a clock signal outputted from the display control means;

a first multiplexer which receives both an output of the first flip-flop and the digital video signals read from the digital video signal storage means as input data signals, and is controlled by the filter enablement signal outputted from the display control means to determine which input data signal is selected;

a first adder which adds an output signal of the first multiplexer and the digital video signals read from the digital video signal storage means;

a second flip-flop which receives an output signal of the first adder and is controlled by the clock signal outputted from the display control means;

a second multiplexer which receives both an output signal of the second flip-flop and the output signal of the first adder as input data signals, and is controlled by the filter enablement signal outputted form the display control means to determine which input data signal is selected; and a second adder which obtains and outputs an addition mean of an output signal of the second multiplexer and the output signal of the first adder to the panel display.

* * * * *